(12) United States Patent
Miyake et al.

(10) Patent No.: US 7,076,086 B2
(45) Date of Patent: Jul. 11, 2006

(54) IMAGE INSPECTION DEVICE

(75) Inventors: Hiroyuki Miyake, Ashigarakami-gun (JP); Norikazu Yamada, Ashigarakami-gun (JP); Tetsuichi Satonaga, Ashigarakami-gun (JP); Eigo Nakagawa, Ashigarakami-gun (JP); Koki Uwatoko, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 676 days.

(21) Appl. No.: 10/268,708

(22) Filed: Oct. 11, 2002

(65) Prior Publication Data

US 2003/0076518 A1    Apr. 24, 2003

(30) Foreign Application Priority Data

Oct. 11, 2001   (JP)   ............... 2001-313849

(51) Int. Cl.
*G06K 9/00*   (2006.01)

(52) U.S. Cl. ............... 382/112; 358/1.9; 358/3.24

(58) Field of Classification Search ........... 382/100, 382/110, 112, 141–147, 152; 356/73.1, 237.1, 356/238.1, 241.1, 241.2, 426, 240.2, 240.1; 358/462, 3.26, 1.9, 3.24; 250/234; 359/662

See application file for complete search history.

(56) References Cited

U.S. PATENT DOCUMENTS 5,067,812 A * 11/1991 Sugimura et al. ........ 356/237.5
5,969,789 A * 10/1999 Houston et al. ............ 351/159
6,147,704 A * 11/2000 Ito et al. ................. 348/222.1
6,272,244 B1 * 8/2001 Takahashi et al. .......... 382/190
6,600,872 B1 * 7/2003 Yamamoto .................. 386/67
6,801,334 B1 * 10/2004 Enomoto .................. 358/1.18
6,809,757 B1 * 10/2004 Ito et al. ................... 348/143
2001/0019423 A1 * 9/2001 Hirai ...................... 358/1.15

FOREIGN PATENT DOCUMENTS

JP     A 8-190630      7/1996
JP     A 2000-123176   4/2000

* cited by examiner

*Primary Examiner*—Jingge Wu
*Assistant Examiner*—Abolfazl Tabatabai
(74) *Attorney, Agent, or Firm*—Oliff & Berridge, PLC

(57) ABSTRACT

An image inspection device to automate and simplify inspection of an output image. A paper discharge tray of a printer is a different color from paper. A CCD camera is disposed above a paper discharge portion of the printer, at which paper is discharged, and can capture the whole upper face of the paper discharge tray. When, directly after a state in which there is no paper on the paper discharge tray, a print job is received and a first print-processed sheet is outputted to the paper discharge tray, a CPU controls the CCD camera to capture the paper discharge tray in this state. Captured image data including the paper is acquired, corrections are applied to the captured image data and to original image data by image processing, and image characteristics thereof are made substantially the same. Thereafter, the outputted image is inspected by comparison of the two data sets.

15 Claims, 11 Drawing Sheets

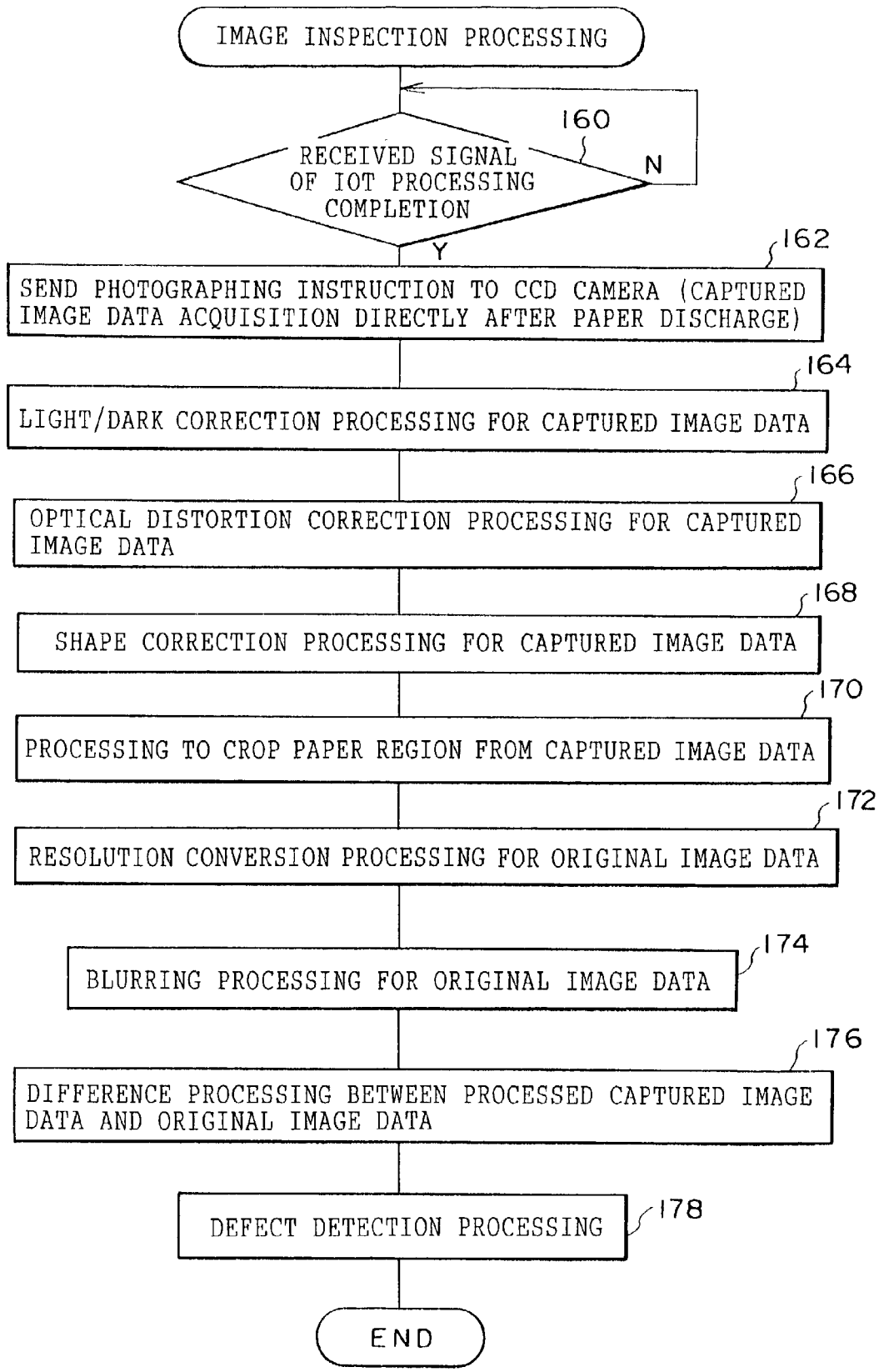

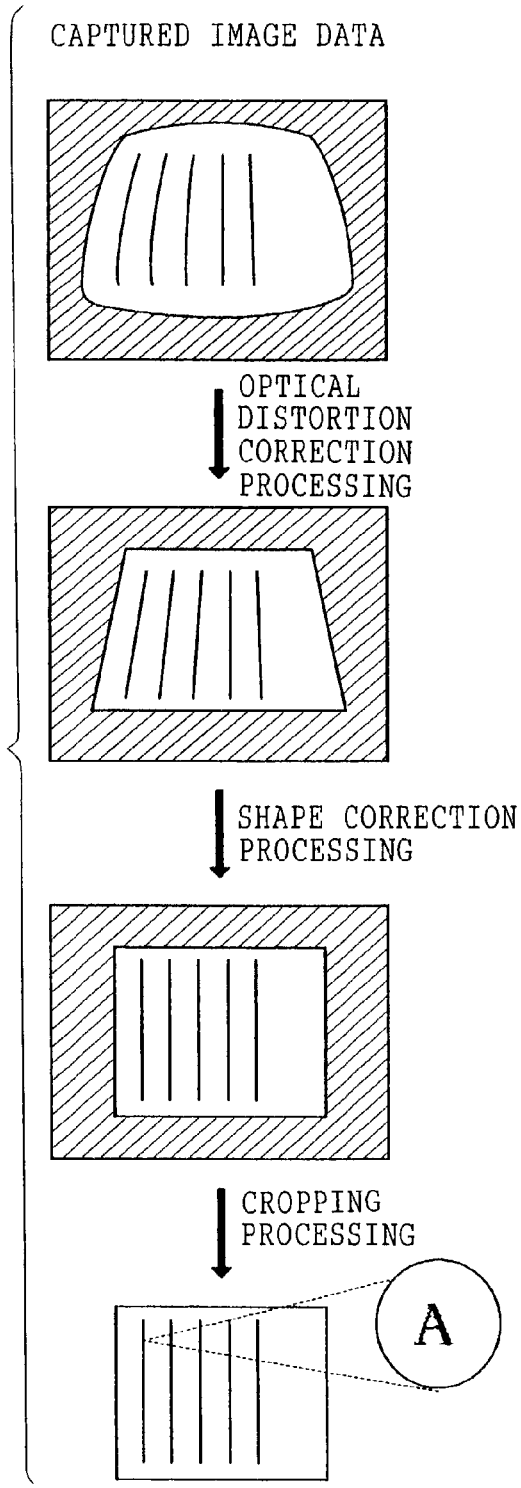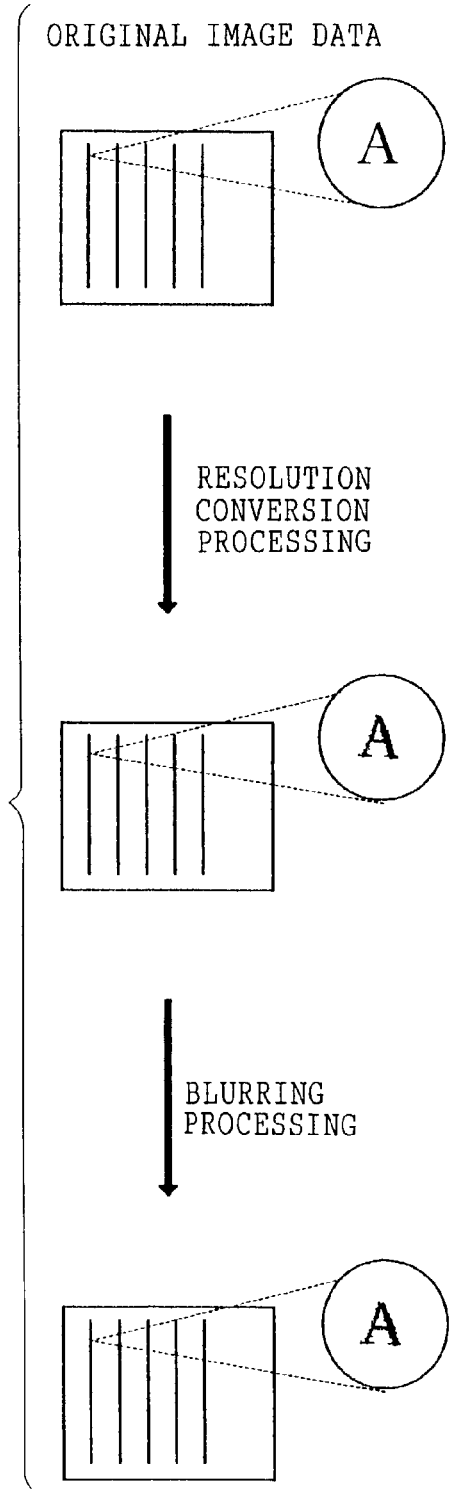

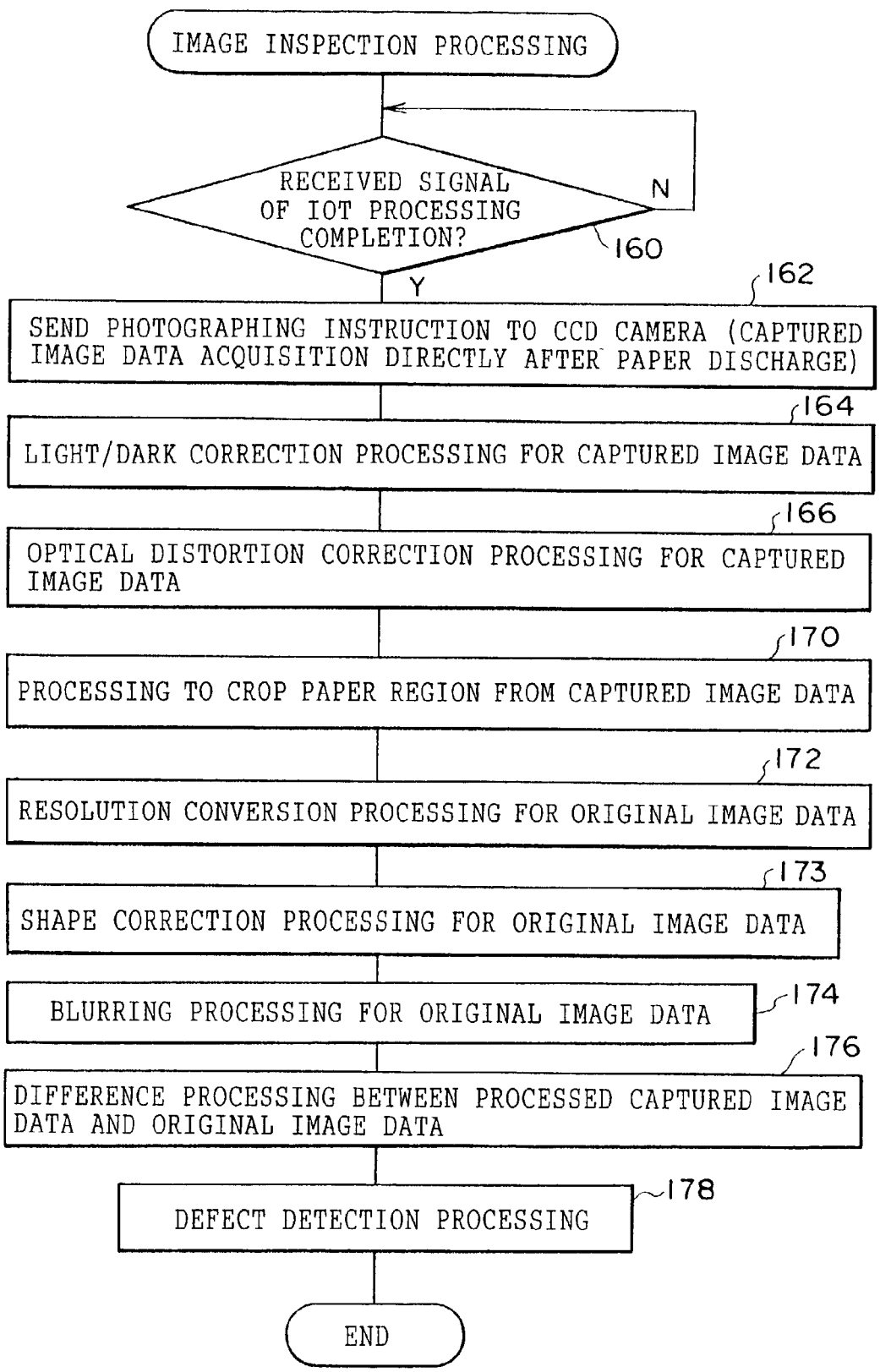

IMAGE INSPECTION DEVICE

BACKGROUND OF THE INVENTION

1. Field of the Invention

The present invention relates to an image inspection device, and particularly relates to an image inspection device to be used in an image output device which outputs an image recording medium, on which an image has been recorded on the basis of image data, to an output tray.

2. Description of the Related Art

Conventionally, in order to maintain image quality of print in a printing apparatus, inspections of print results (outputted images) has been performed. In recent years, demands for higher image quality, even in laser beam printers and digital copying devices equipped with laser beam printers, have risen, and maintenance in accordance with inspection of outputted images has been deemed to be necessary. Further, in order to lower costs, automation and remote operation of maintenance works have been called for.

Japanese Patent Application Laid-Open (JP-A) No. 8-190630 proposes a technique for automatically carrying out adjustment of image quality in an image-forming device, in accordance with image difference between an original image and a copied image. More specifically, reference original data for image adjustment is memorized, the reference original data is output at a time of image adjustment, an output sheet thereof is digitized by an image scanner, and density differences between these two sets of image data are obtained at predetermined comparison points. Parameters at various sections of the copying device are adjusted in accordance with these different values, and thus image quality is maintained.

Moreover, JP-A 2000-123176 proposes a technique for carrying out inspection of images by comparing output matter with reference image data, which is acquired from original image data before raster expansion (rasterizating) of the output matter and subjected to image processing in accordance with characteristics of a means for reading the output matter. In this technique, the reference image data is obtained from the image data before raster expansion, and thus a precise inspection is carried out. The comparison is carried out with deviation of a position of the output matter at the reading means being estimated.

However, in the technique described in JP-A 8-190630, an image scanner is used for re-digitizing the outputted image, and an operator is required to set paper on which the image has been printed at the image scanner. Thus, there is a problem in that inspection of the output image cannot be completely automated.

Moreover, in the technique described in JP-A 2000-123176, a deviation amount of the paper at the means for reading the output matter is not an actual value, but a predicted value. Therefore, there is a problem in that comparison processing is complicated.

SUMMARY OF THE INVENTION

The present invention is provided to solve the above-described problems, and an object of the present invention is to provide an image inspection device which is designed to automate and simplify inspection of an output image.

In order to achieve the above object, a first aspect of the present invention is an image inspection device useable in an image output apparatus which records an image on an image recording medium on the basis of image data and outputs the image recording medium to an output tray, the device comprising: an image capturing section for capturing the image recording medium on the output tray; a controlling section which controls capturing by the image capturing section so as to acquire captured image data, which is acquired by capturing the image recording medium on which the image is recorded on the basis of the image data; an image-processing section which applies image processing to at least one of the image data and the captured image data for setting image characteristics of the image data and the captured image data to be substantially the same as one another; and a detecting section which detects abnormalities of the image recorded on the image recording medium, on the basis of the image data and the captured image data whose image characteristics are substantially the same as one another by the image processing of the image-processing section.

According to the present invention, at the image output apparatus, the image recording medium on which the image has been recorded on the basis of the image data is outputted to the output tray. At the image inspection device, the image recording medium outputted to the output tray is captured by the image capturing section in accordance with control by the controlling section. At the image-processing section, image processing is carried out on at least one of the image data used by the image output apparatus and the captured (captured) image data acquired by capturing at the image capturing section. The image characteristics of the two sets of data (resolution, shape, sharpness and the like) are set to be substantially equal to one another, and difference between the two sets of data due to characteristics when the image is outputted by the image output apparatus and characteristics when the image is captured by the image capturing section are corrected. At the detecting section, on the basis of the captured image data and the image data after the image characteristics thereof have been adjusted, abnormalities of the image are detected by, for example, taking difference between the two sets of data, comparing the captured image data with threshold values which are specified in advance in accordance with the image data, or the like.

Accordingly, a work operation to set an image recording medium such as paper at an image scanner, which was required in the prior art, is not necessary. Thus, image inspection can be automated and, because the image characteristics of the image data and the captured image data are adjusted by the image-processing section, image abnormalities can be detected simply.

In a second aspect of the present invention according to the first aspect, the controlling section comprises a determining section which, at a time when the image output apparatus is in a waiting state, determines whether the image recording medium is present or absent on the output tray, and the controlling section controls the image capturing section so as to capture the image recording medium when the image recording medium is outputted for the first time after the determining section determines that the image recording medium is absent from the output tray. That is, image abnormality detection is carried out by the detecting section using captured image data that is captured at a time when there is only one image recording medium on the output tray. Consequently, consideration does not need to be given to deviation amounts of the image recording medium as in the prior art, and the position of the image recording medium can be simply detected from the captured image data.

Here, in a third aspect of the present invention according to the second aspect, the determining section determines whether the image recording medium is present or absent on the basis of captured image data which is acquired by the image capturing section capturing at a time when the image output apparatus is in the waiting state.

Further, in a fourth aspect of the present invention according to any one of the first to the third aspects, the image-processing section applies to the captured image data: optical distortion correction processing which compensates for optical distortion at the image capturing section; shape correction processing which compensates for geometrical distortion; and specification processing which specifies a region of the image recording medium, and the image-processing section applies to the image data: resolution conversion processing which converts a resolution of the image data in accordance with a resolution of the captured image data; and blurring processing which reduces sharpness of the image data in accordance with the captured image data. In this case, because the image characteristics of both the captured image data and the image data are substantially the same, image abnormality detection by the detecting section is possible.

Alternatively, in a fifth aspect of the present invention according to any one of the first to the third aspects, the image-processing section applies to the captured image data: optical distortion correction processing which compensates for optical distortion at the image capturing section; and specification processing which specifies a region of the image recording medium, and the image-processing section applies to the image data: resolution conversion processing which converts a resolution of the image data in accordance with a resolution of the captured image data; shape correction processing which applies geometrical distortion to the image data in accordance with the captured image data; and blurring processing which reduces sharpness of the image data in accordance with the captured image data. In this case too, because the image characteristics of both the captured image data and the image data are substantially the same, image abnormality detection by the detecting section is possible.

Still further, in a sixth aspect of the present invention according to any one of the first to the third aspects, the image data is a predetermined test image data, and the image-processing section applies to the captured image data: optical distortion correction processing which compensates for optical distortion at the image capturing section; shape correction processing which compensates for geometrical distortion; and specification processing which specifies a region of the image recording medium, and the detecting section compares the captured image data that is image-processed by the image-processing section with a threshold value specified in advance in accordance with the test image data. That is, image characteristics of the captured image data can be made substantially the same as for the test image data by the image-processing section. Given that the predetermined test image data has been established in advance, a threshold value (or possibly a range) in accordance with the test image data can be obtained beforehand. Consequently, image abnormality detection by comparison of these is possible.

Furthermore, in a seventh aspect of the present invention according to any one of the fourth to the sixth aspects, in a case in which the image output apparatus outputs a plurality of image recording mediums on each of which an image is recorded on the basis of output instructions for the plurality of image recording mediums, that is, when a print job instructs image output of a plurality of sheets, image defect detection may be carried out for each of the image output results of the plurality of sheets. In such a case: the captured image data is acquired by capturing a first image recording medium when the first image recording medium is outputted, a specification position, which specifies the region of the first image recording medium, is obtained by the specification processing being applied to the captured image data, and the image-processing section applies the specification processing to captured image data of the image recording mediums that are outputted subsequent to output of the first image recording medium on the basis of the specification position.

Furthermore, in an eighth aspect of the present invention according to any one of the first to the seventh aspects, the image-processing section sets resolutions, sharpnesses and configurations of images based on the image data and the captured image data to be substantially the same as one another.

Furthermore, in a ninth aspect of the present invention according to any one of the first to the seventh aspects, the image-processing section applies the image processing to the image data subject to rasterizating.

BRIEF DESCRIPTION OF THE DRAWINGS

FIG. 6 is a flowchart showing an example (processing example 1) of image inspection processing.

FIG. 7A is a schematic diagram showing image processing which is carried out on captured image data by the image inspection processing of FIG. 6.

FIG. 7B is a schematic diagram showing image processing which is carried out on original image data by the image inspection processing of FIG. 6.

FIG. 8 is a flowchart showing another example (processing example 2) of image inspection processing.

DESCRIPTION OF THE PREFERRED EMBODIMENTS

An exemplary embodiment relating to the present invention will be explained in detail with reference to the drawings. Below, an example of a case in which the present invention is structured as a portion of a laser beam print processing system is explained.

Figure 1:
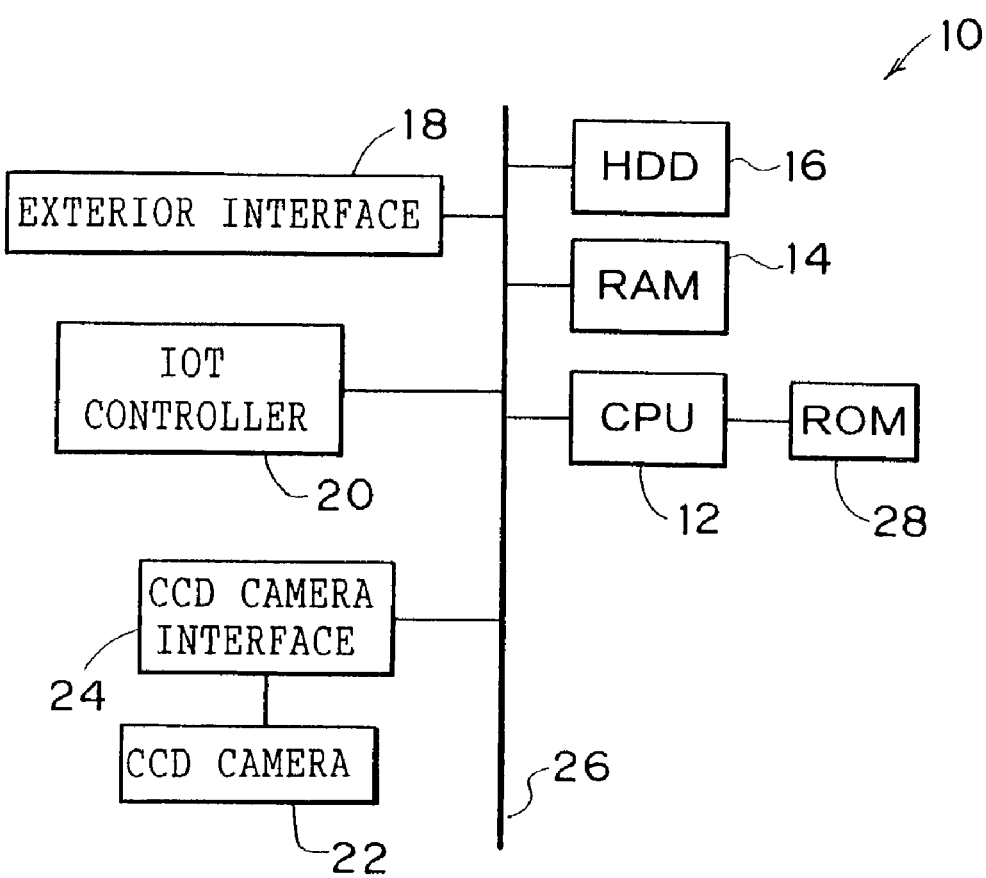
FIG. 1 is a block diagram showing structure of a print processing system relating to an embodiment of the present invention.

FIG. 1 shows a print processing system in which the present invention is applied. An image inspection device is installed in a laser printer 50 (below referred to as "printer") of FIG. 2.

As shown in FIG. 1, in a print processing system 10 the following components are connected to each other by a data bus 26: a CPU 12; a RAM 14; a hard disk 16; an interface (I/F) circuit 18 which interfaces with an exterior portion for inputting data for printing or the like (described later), in PDL or the like; an IOT controller 20 which is an interface circuit that interfaces with an image output terminal (IOT, not shown), which prints out images onto paper as electrostatic latent images using a light beam from a laser diode; and an interface circuit 24 which interfaces with a CCD camera 22, which is an image capturing (photographing) section.

A ROM 28 for program storage is connected at the CPU 12. The CPU 12 reads an appropriate program from the ROM 28 and executes the program. Thus, the CPU 12 functions as a controlling section, an image-processing section and an inspecting section of the present invention. The CPU 12 controls print control processing, image inspection feasibility determination processing, image inspection processing and the like, which are described later. Further, the CPU 12 transmits and receives image data for print processing, image inspection processing and the like to and from other hardware through the data bus 26.

At an interface portion of the interface circuit 18, there is a parallel port which connects with, for example, a printer port of a PC (personal computer), and/or an ETHERNET (R) interface can be used.

The hard disk 16 is provided with an area for storing data for printing that has been inputted from the exterior through the interface circuit 18, and an area for storing print-processed image data for a single page, which is created by expressing (rasterizating) the data for printing as a bit map.

The RAM 14 includes a region required for print processing (that is, a work area for print processing), and a buffer region for image data that is transmitted to the IOT controller 20 (this image data is obtained such that the data for printing is expanded (developed) as a bit map). The RAM 14 further includes a region required for image inspection processing (that is, a work area for carrying out image processing for image inspection), and a region for storing captured image data.

The IOT controller 20 rearranges the image data into a processing sequence depending on the IOT, and controls the IOT to generate laser diode signals.

Figure 2:
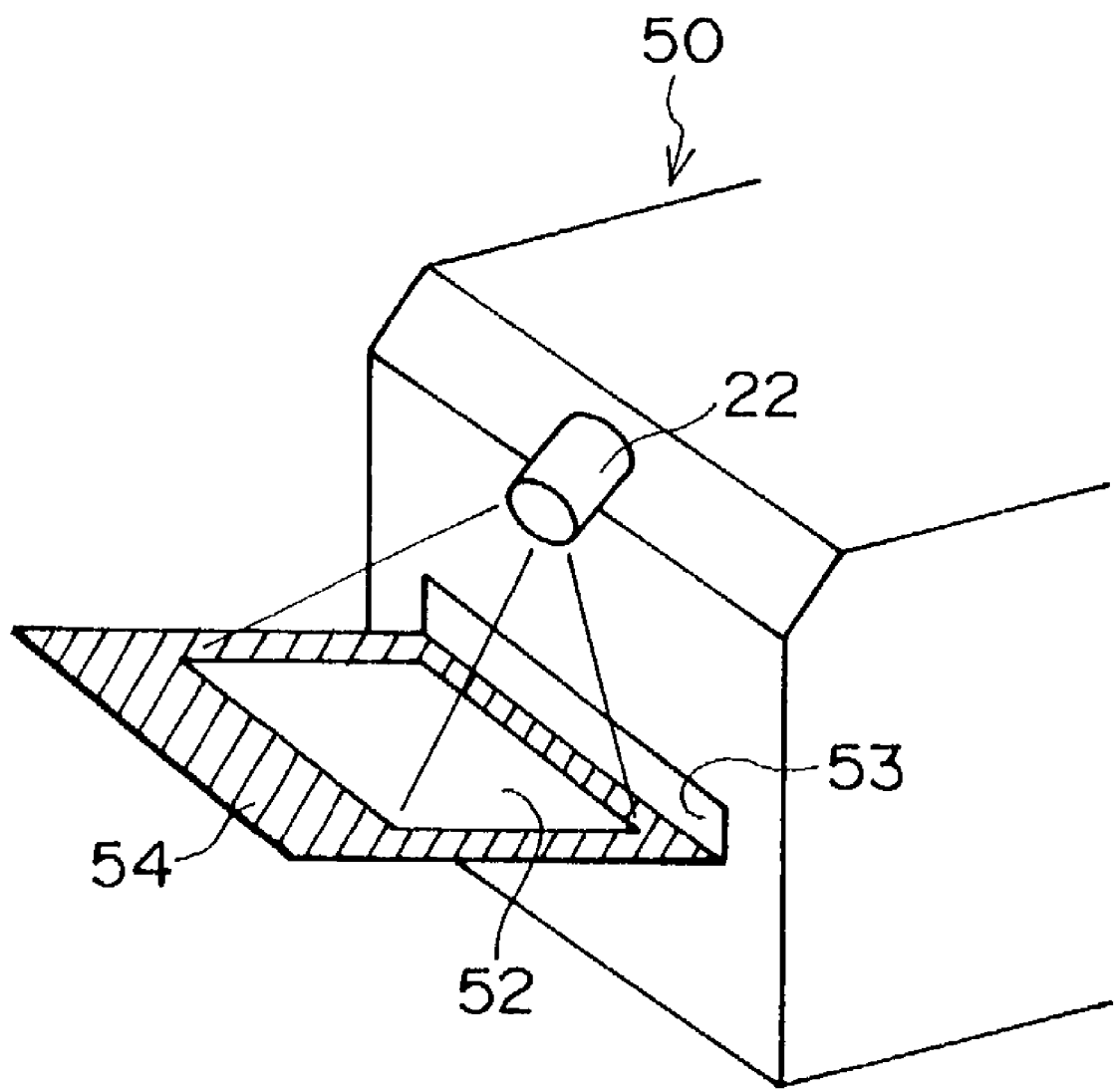
FIG. 2 is a perspective diagram showing the exterior of a laser printer at which the print processing system of FIG. 1 is installed.

The interface circuit 24 which interfaces with the CCD camera 22 performs an analogue-digital conversion of output data from the CCD camera 22 and stores this data at the RAM 14. As shown in FIG. 2, the CCD camera 22 is disposed upward of a paper discharge portion 53 of the laser printer 50, at which paper 52 for which print processing has been completed is discharged onto a paper discharge tray 54 (output tray). The CCD camera 22 is disposed at a position that enables image-capturing (photographing) of the whole of an upper surface of the paper discharge tray 54.

A surface-color of the paper discharge tray 54 is set to a different color from the paper 52. Thus, the paper discharge tray 54 and paper discharged onto the tray can be easily distinguished in photographic results from the CCD camera 22 in a state in which the discharged paper 52 is present on the paper discharge tray 54. Image data acquired by the CCD camera 22 photographing the paper discharge tray 54 in a state in which paper is not present on the paper discharge tray 54 (image data of the tray) is memorized in advance at the RAM 14 described above.

In this laser printer 50, a discharge position to which the paper 52 is outputted onto the paper discharge tray 54 is varied for different print jobs.

Next, for operation of the present embodiment, examples of processing for detecting image defects in a system having the structure described above are explained.

PROCESSING EXAMPLE 1

Figure 3:
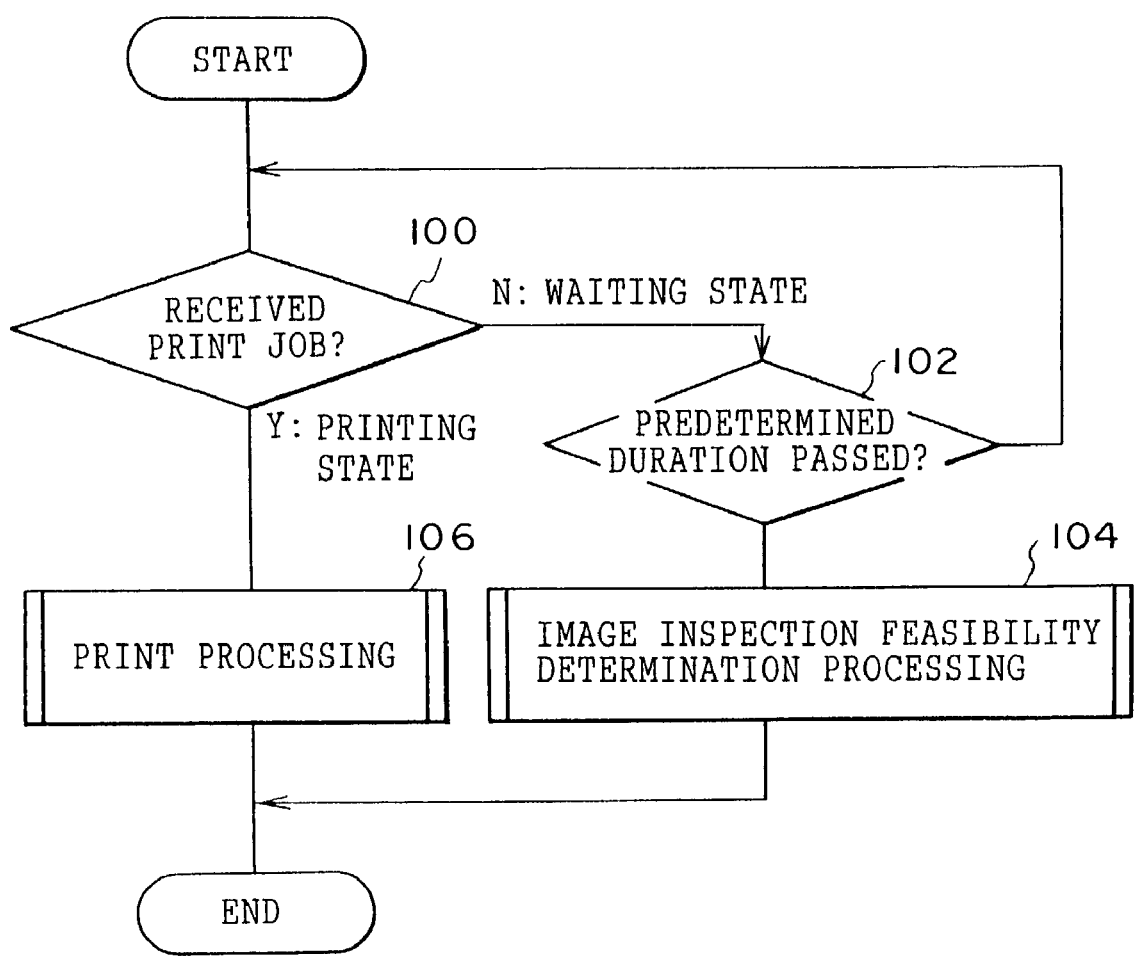
FIG. 3 is a flowchart showing a control routine (main routine) of a printer.

FIG. 3 shows a control routine of the laser printer 50, which is executed by the CPU 12. As shown in FIG. 3, in a waiting state of print processing, control periodically proceeds from step 100 to steps 102 and 104 at predetermined intervals, and an image inspection feasibility determination process shown in FIG. 4 is executed.

Figure 4:
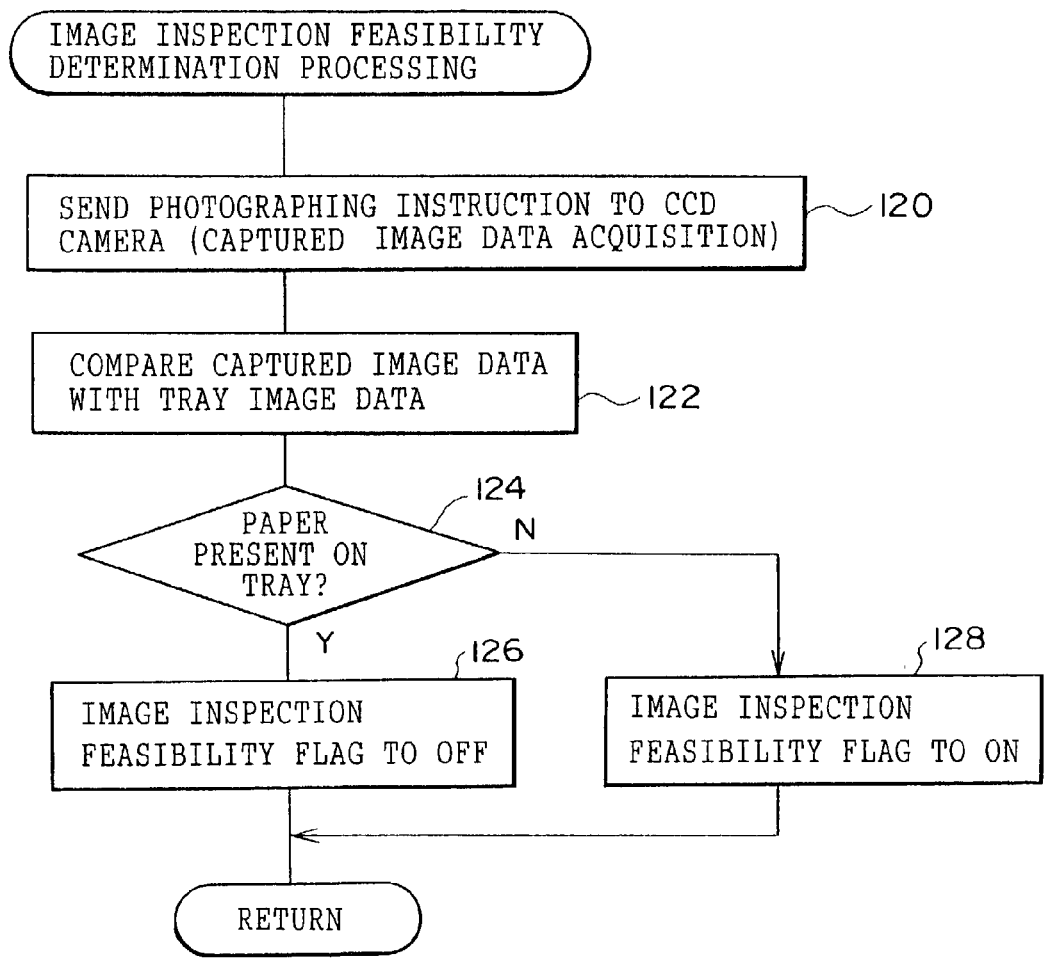
FIG. 4 is a flowchart showing an example (processing example 1) of image inspection feasibility determination processing.

As shown in FIG. 4, in the image inspection feasibility determination process, photographing instruction is sent to the CCD camera 22 in a step 120. The CCD camera 22 photographs the paper discharge tray 54 in accordance with these instruction. The image data photographed by the CCD camera 22 is converted to digital signals at the interface circuit 24 which interfaces with the CCD camera 22, and is stored at the RAM 14.

In a subsequent step 122, the photographed (captured) image data acquired in accordance with the photographing instruction in step 120 is compared with image data for the tray, which has been stored in the RAM 14 in advance. In step 124, it is judged, on the basis of results of this comparison, whether or not paper is present on the paper discharge tray 54. If paper is present on the paper discharge tray 54, it is determined that image inspection will not be feasible, control proceeds to step 126, and an image inspection feasibility flag which represents the feasibility of image inspection is set to OFF. Thereafter, the waiting state continues as before. If paper is absent from the paper discharge tray 54, it is determined that image inspection will be feasible, control proceeds to step 128, and the image inspection feasibility flag is set to ON. Thereafter, the waiting state continues as before.

In other words, because this image inspection feasibility determination processing is carried out periodically at the laser printer 50, while in the waiting state, the state of the paper discharge tray 54 is periodically photographed and feasibility determination results for image inspection, as conserved by the image inspection feasibility flag, are continually renewed.

Although the presence or absence of paper on the paper discharge tray is determined on the basis of photographic results from the CCD camera in the present embodiment, a dedicated sensor could be provided for detecting the presence or absence of paper on the paper discharge tray, and the presence or absence of paper could be determined on the basis of detection results from such a sensor. However, if this dedicated sensor is used, then the number of components will increase. Therefore, in order to reduce costs, it is more preferable to use photographic results from the CCD camera 22 as in the present embodiment.

Figure 5:
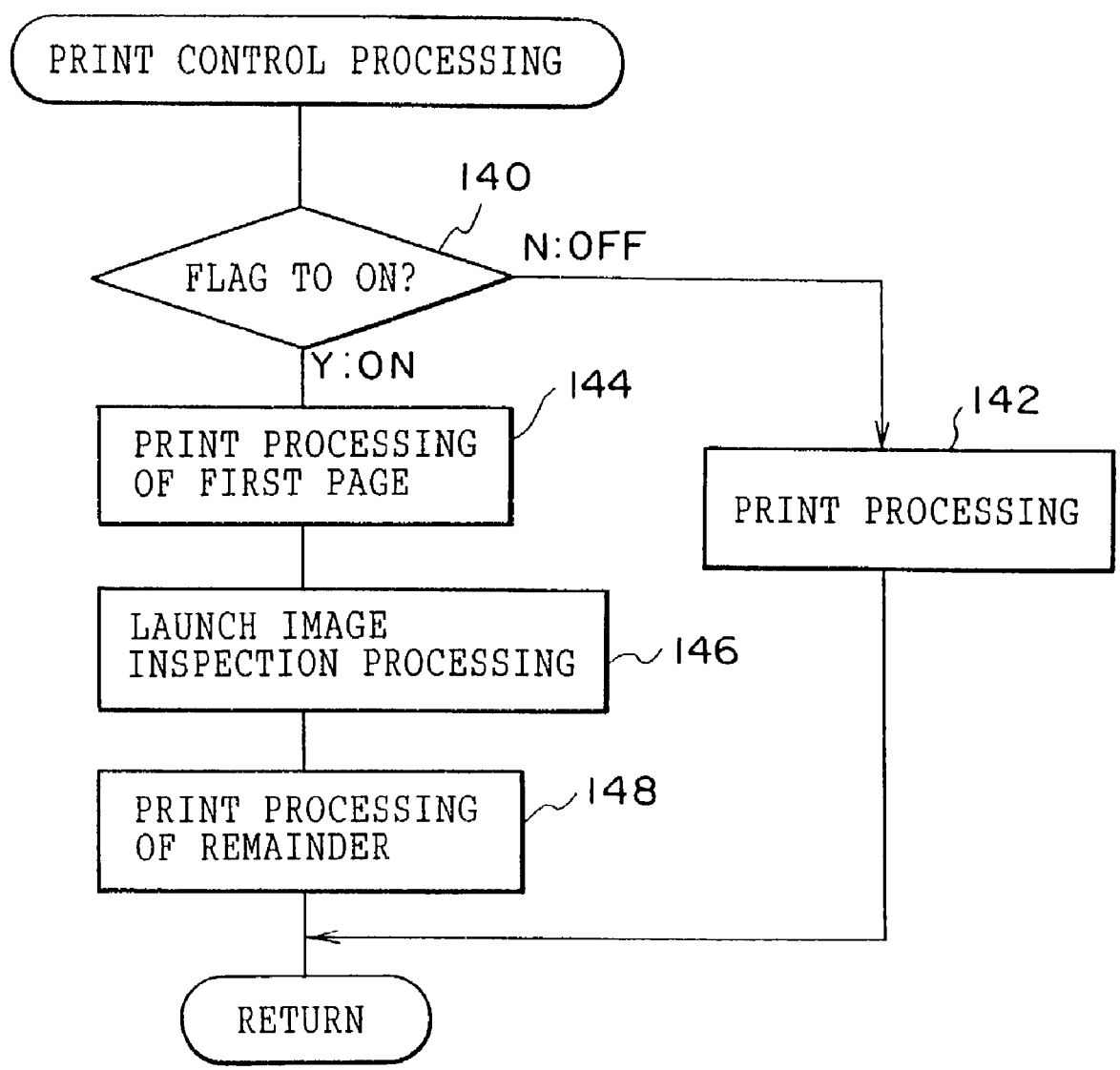
FIG. 5 is a flowchart showing an example (processing example 1) of print control processing.

Moreover, as shown in FIG. 3, when the CPU 12 receives a print job, which is data for printing that is inputted from the exterior via the interface circuit 18, control passes from step 100 to step 106, there goes from the waiting state into a printing state, and a print control process shown in FIG. 5 is carried out.

As shown in FIG. 5, the print control process first determines the state of the image inspection feasibility flag in step 140. If the image inspection feasibility flag is set to OFF, it is determined that image inspection is not feasible, control proceeds to step 142 and each page is rendered on the basis of the received print job. Then, the rendered (expanded) image data is transmitted to the IOT controller 20 and a usual printing process is carried out. When the printing process has completed, there returns to the waiting state again.

Alternatively, if the image inspection feasibility flag is set to ON, it is determined that image inspection is feasible and control passes to step 144. First, on the basis of the received print job, processing is carried out for a single sheet only, and image data thereof is stored at the hard disk 16. More specifically, a first page is rendered, and then the image data thereof is both transmitted to the IOT controller 20 and stored at the hard disk 16. Instruction for printing only the one page is transmitted to the IOT controller 20, and thus print processing is carried out for the first page only.

Hence, an image inspection process shown in FIG. 6 is launched in a subsequent step 146. Thereafter, control passes to step 148. In a case in which the received print job is a print job which designates printing of a plurality of pages (printing a plurality of pages, printing a plurality of copies of only one page, printing a plurality of copies of a plurality of pages, or the like), print processing of the remaining pages of the print job is carried out in parallel with the image inspection processing of FIG. 6 and, the printer 50 goes into a waiting state when print processing has finished. The print processing and the image inspection processing may be carried out by time-divided serial processing.

As shown in FIG. 6, in a step 160 of the image inspection processing, waiting for a signal of completion of print processing of the first page from the IOT controller 20. When this signal has been received, control passes to step 162. After a predetermined duration (a duration specified in advance for print-processed paper to be discharged to the paper discharge tray 54), a photographing instruction is transmitted to the CCD camera 22. In accordance with this instruction, the CCD camera 22 photographs directly after a state in which paper is not present on the paper discharge tray 54 has changed to a state in which the first print-processed sheet of paper has been discharged onto the paper discharge tray 54. The image data photographed by the CCD camera 22 is converted to digital signals at the interface circuit 24 which interfaces with the CCD camera, and is stored at the RAM 14.

In a next step 164, light/dark correction (shading correction) is implemented for this image data stored at the RAM 14 (below referred to as "photographed (captured) image data") on the basis of compensation data, which is created in advance by an administrator photographing a white sheet at a time of maintenance or the like and is stored at the RAM 14 or the hard disk 16. Then, optical distortion correction is implemented in step 166, and shape correction, from a trapezoid shape to a rectangular shape (perspective conversion processing), is implemented in step 168.

The optical distortion correction compensates for distorting aberrations of a lens of the CCD camera. Generally, an aberration d for an incident angle at the lens θ can be represented by the following formula, in which a distance from the lens to an imaging surface is c and a distance of an imaging position from the optical axis at the imaging surface is r.

$$d = r - c \tan \theta$$

The optical distortion correction is carried out on the basis of the characteristics of this lens aberration d. Alternatively, because the distortion d is generally proportional to the third power of r, a proportional constant based on the lens characteristics can be found and the optical distortion correction carried out using this constant.

The shape correction from a trapezoid shape to a rectangular shape is a process for correcting for geometrical distortion contained in the captured image data. The captured image data obtained by photographing by the CCD camera 22 is a projection of a three-dimensional space onto a two-dimensional plane. The CCD camera 22, which is disposed as shown in FIG. 2, photographs at an inclination with respect to the paper discharge tray 54. Accordingly, the greater the distance along a sight line from the CCD camera 22, the longer a projected dimension in a horizontal direction in the two-dimensional plane, which intersects the sight line direction. Thus, geometric distortion occurs. Because of this geometric distortion, the paper on the paper discharge tray 54 is projected into a trapezoid shape. Therefore, the shape correction converts this shape to the rectangular shape of the paper itself. As a result, the photographic image data can be applied in correspondence to the original image data.

In a next step 170, specification processing specifies a position (region) of the paper from the corrected captured image data, using a difference between a background color, namely, color of the paper discharge tray 54 and color of margin (edge) of the paper (generally, because printing is not performed at a margin portion of the paper, the margin portion is the color of the paper itself). The corrected captured image data is cropped to only the paper region that is specified (namely, only the paper region is cut from the corrected captured image data), and the result of cropping is stored at the RAM 14 as captured image data for comparison.

In the present embodiment, the corrected captured image data is cropped to the paper region in order to reduce memory usage and to speed up comparison processing with the original image data (a difference processing of step 176, which is described below). However, this comparison with the original image data is possible as long as the paper region can be specified. Thus, co-ordinates of the specified paper region may be memorized and cropping of the paper region omitted.

At this time, if the image data that is used is photographed in a state in which other paper, for example, paper discharged by a previous print job or the like, is present on the paper discharge tray 54, then a region of the other paper might be included after cropping. However, as described above, the image data that is used is photographed directly after the first sheet of the paper 52 has been discharged, subsequent to a state in which paper was not present on the paper discharge tray 54. That is, the photographic image data is photographed in a state in which only one sheet of the paper 52 is on the paper discharge tray 54. Therefore, the paper region can be easily specified and cropped by the color difference alone, without regard to a displacement amount of the paper.

In other words, as shown in FIG. 7A, the photographic image data from the CCD camera 22, of the state in which the paper is on the paper discharge tray, is corrected for lens distortion aberrations by the optical distortion correction and the shape of the paper region on the image data is adjusted by the shape correction. Then the paper region is specified from the corrected captured image data, and is cropped to the specified paper region alone. Thus, the captured image data for comparison is generated.

In a next step 172, resolution conversion processing is carried out on a resolution of the image data which has been stored at the hard disk 16 and used for print processing of the first page (below referred to as the "original image data"), to convert the resolution in accordance with a resolution of the CCD camera 22, using a linear interpolation method or the like. In a next step 174, blurring processing (gauss filter processing) is carried out on the resolution-converted original image data so as to reduce sharpness of the image, in order to deliberately apply thereto blurring caused in the optical system of the CCD camera and blurring caused by the optical distortion correction and the shape correction. Results thereof are stored at the RAM 14 as original image data for comparison.

In other words, as shown in FIG. 7B, the original image data is matched to a resolution of the captured image data from the CCD camera 22 by the resolution conversion processing, and is blurred, in substantially the same way as blurring contained in the captured image data after image processing, by the blurring processing. Thus, the original image data for comparison is generated.

Now, because the original image data that was used at the time of transmission to the IOT controller has already been given the characteristics of printing by the IOT (the output image), the original image data represents a case in which image processing is performed on the original image data with consideration only to the characteristics of photographing by the CCD camera 22. However, the image data before rendering may be used as the original image data, and image processing may be performed with consideration to characteristics of image outputting and characteristics of photographing. However, in a case in which the image data before rendering is used as the original image data, it is necessary for the CPU to perform rendering at the time of image processing in order to generate original image data for comparison, in addition to the rendering at the time of transmission to the IOT controller. Thus, in order to shorten processing time, it is preferable that the rendered image data at the time of transmission to the IOT controller is used as the original image data, as in the present embodiment.

Accordingly, because the image processing is carried out on the photographic image data and the original image data, characteristics of both sets of data, that is, resolution, shape and brightness, are adjusted to be substantially the same. In other words, the photographic image data for comparison and the original image data for comparison are generated so as to have substantially the same image characteristics as one another.

Next, in a subsequent step 176, difference processing is carried out on the captured image data for comparison and original image data for comparison that have been generated. If the cropping process has been omitted, differences may be taken between corresponding pixels on the basis of memorized coordinates of the paper region, with pixels of the captured image data being corresponded with pixels of the original image data.

Hence, if there is a defect pattern of black spots or the like at a print-out side, that is, in the captured image data, the black spots will be left in difference results. In a next step 178, the difference results are binarized by specifying an appropriate threshold value of density, and thus defects such as black spots and like can be detected.

When image defects are detected, a warning can be shown on a user interface (not shown) such as a display panel or the like provided at the laser printer 50, a warning can be sent to an external portion through the interface circuit 18 and, for example, displayed at a PC which executes printing using print management software or the like and which is connected to the laser printer 50 via a cable or network, or a notification can be sent through a network to a printer maintenance operator, via a remote maintenance system or the like.

In the above description, detection of localized image defects such as black spots and the like has been described. However, image quality problems such as overall density variations, density shifts and the like can also be detected.

In the image inspection processing in the above description, first the image processing is applied to the captured image data and the captured image data for comparison is generated, and then the image processing is applied to the original image data and the original image data for comparison is generated. However, the processing may be applied to the captured image data and the original image data in parallel.

Furthermore, processing for detecting image defects is not limited to what is described above. Other examples are shown below.

PROCESSING EXAMPLE 2

In processing example 1, an example of a case in which, in the image inspection processing, the shape processing is applied to the captured image data for comparison of the captured image data and the original image data has been explained. However, the shape processing may be applied to the original image data side. FIG. 8 shows a flowchart of an image inspection process in such a case. In FIG. 8, processing that is the same as in FIG. 6 is given the same step numbers, and details thereof will not be explained.

As shown in FIG. 8, optical distortion correction is applied to the captured image data in step 166. Then control passes to step 170, the paper region is specified, cropping to the specified paper region is carried out, and captured image data for comparison is stored at the RAM 14. That is, the captured image data for comparison is cropped with the paper region still in a trapezoid shape.

Resolution conversion processing is applied to the original image data in step 172. Then control passes to step 173, and shape conversion from a rectangular shape to a trapezoid shape (perspective conversion processing) is carried out. By this shape conversion from the rectangular shape to the trapezoid shape, geometric distortion contained in the captured image data is deliberately applied to the original image data, and this can be corresponded with the shape of the paper region that was cropped in step 170. In the next step 174, blurring processing is applied, and this original image data for comparison is stored at the RAM 14.

Thus, the original image data for comparison is generated by shape-converting the image data to the trapezoid shape to match the captured image data for comparison. Thus, difference processing of the captured image data for comparison and the original image data for comparison can be carried out in step 176. In the same way as in a case in which the captured image data side is shape-converted, if there are defect patterns such as black spots at the captured image data side, then those black spots will remain in difference results after the difference processing, and thus image defects can be detected.

PROCESSING EXAMPLE 3

In processing example 1, detection of image defects is carried out by image inspection processing for only the first page of print processing results in a print job, and then defect judgement is carried out. However, as described above, detection of image defects is performed by difference processing after correction has been applied to both captured image data and original image data. Therefore, there is a possibility that erroneous judgements may occur, due to threshold values used at the time of defect judgement, correction errors and the like. Accordingly, defect judgement may be carried out not by detecting image defects on just the first page of print processing results, but by carrying out defect judgement by image inspection processing of print processing results of a plurality of pages.

Figure 9:
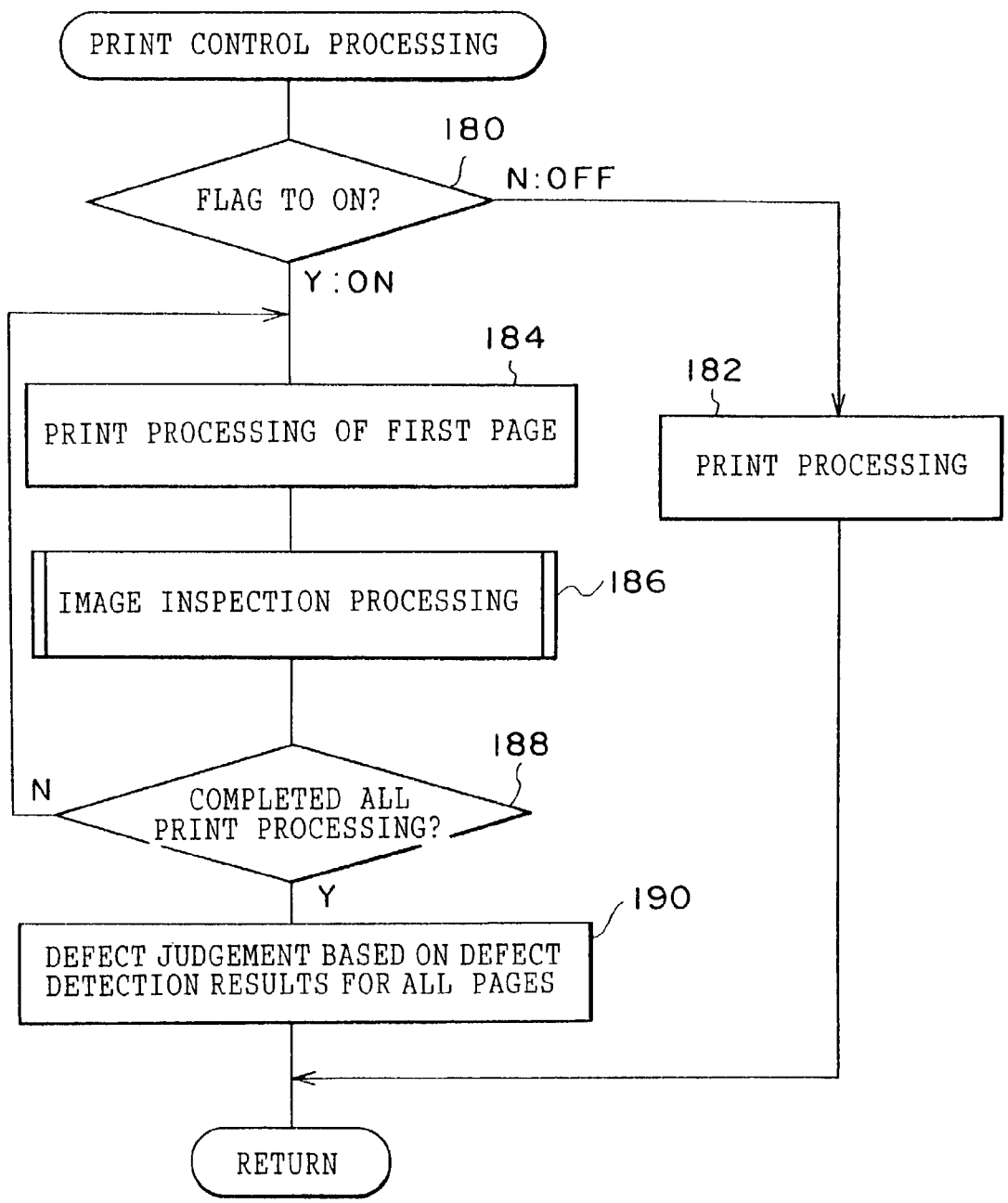
FIG. 9 is a flowchart showing another example (processing example 3) of print control processing.

FIG. 9 shows a flowchart of print control processing in a case in which, as an example, image defect detection is carried out for all print processing results in one print job, and thus defect judgement is carried out.

In the print control processing shown in FIG. 9, when a print job is received and print processing is carried out, first, the state of an image inspection feasibility flag is determined in step 180. If the image inspection feasibility flag is OFF, it is determined that image inspection is not feasible, control passes to step 182, and usual print processing is carried out on the basis of the received print job.

On the other hand, if the image inspection feasibility flag is ON, it is determined that image inspection is possible, control passes to step 184, and print processing is carried out for one page. Then, in step 186, image inspection processing is carried out, and defect detection is carried out for the print processing results. The image inspection processing that is executed here may be the process shown in FIG. 6, and may be the process shown in FIG. 8. Thereafter, control returns from a subsequent step 188 to step 184 and print processing and image inspection processing are carried out one page at a time until all print processing instructed by the received print job has been completed.

Because a position on the paper discharge tray 54 of the paper that is outputted is constant within a single print job, paper region determination (that is, position detection and cropping of the paper region) may be carried out for the first page only. The same co-ordinate values can be used from the second page onward. Further, after print processing for each page, resolution conversion of the original image and photographing by the CCD camera 22 only may be carried out. The (resolution-converted) original image data and the captured image data which have been obtained thus may be stored temporarily at the hard disk 16, and the respective processings carried out after the print job has finished.

When all print processing instructed by the print job has been completed, control passes from step 188 to step 190, and defect patterns are detected from the print processing results of the respective pages. For example, if the same defect pattern is present on at least half of the pages of the print job, then it can be judged that there is an image defect. If such a pattern is present on less than half the pages, then there may have been a detection error, and it can be judged that such an image defect is absent. The reference value of half the number of pages that is used here is used as an example, and can be specified freely.

PROCESSING EXAMPLE 4

Figure 10:
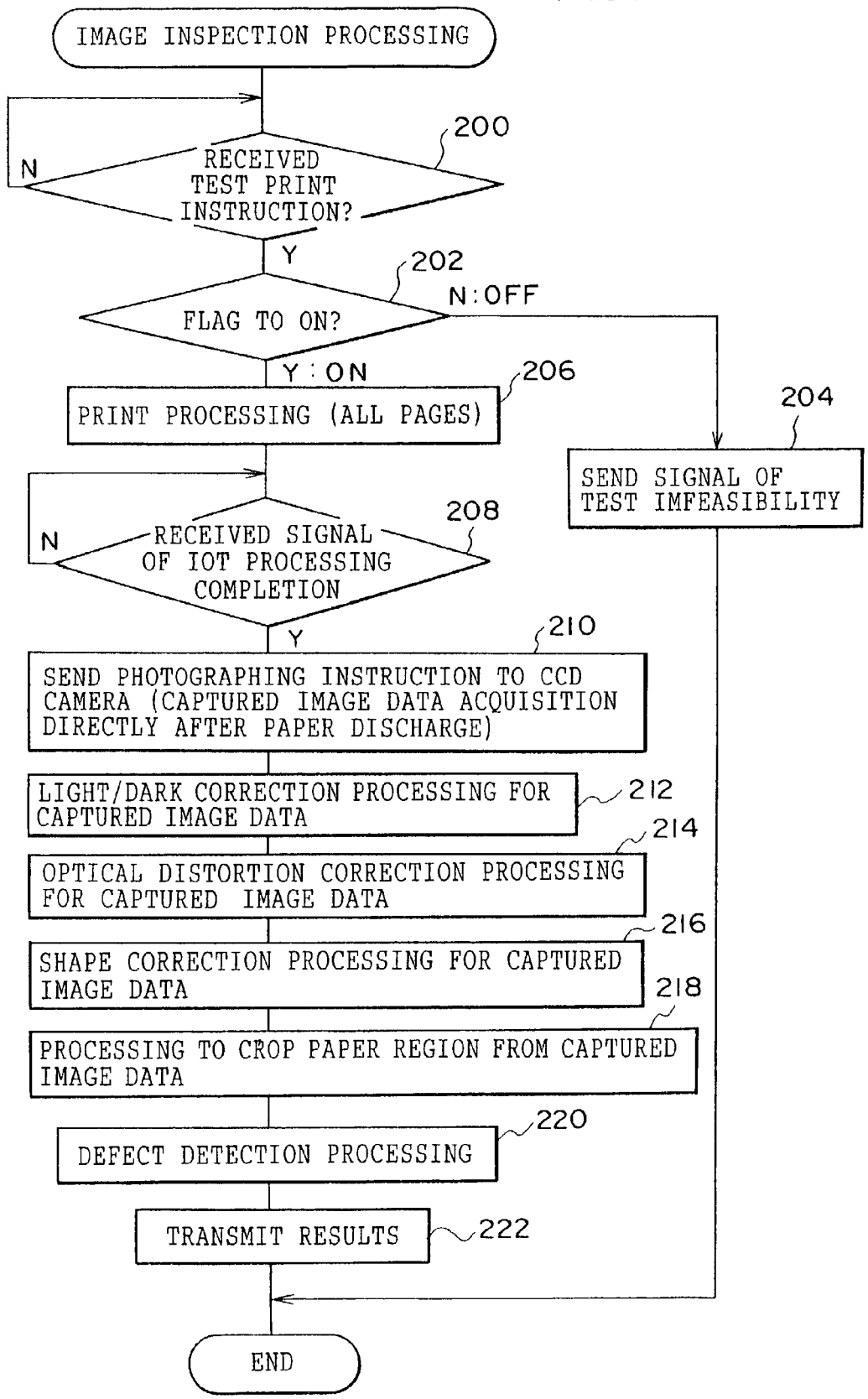
FIG. 10 is a flowchart showing yet another example (processing example 4) of image inspection processing.

In processing example 1, an example of a case in which image defect detection is carried out by difference processing of the original image data and the captured image data has been explained. However, image defect detection can be carried out without difference processing, by preparing reference image data for image inspection, such as image data in which a page is completely white (a solid white page), completely black (a solid black page) or the like, when the printer is in a waiting state. A test print can be instructed from a user interface, in the case of a stand-alone copier or printer or the like, or remotely across a network in the case of a printer attached to a network. Hence, the image defect inspection is carried out. FIG. 10 shows a flowchart of image inspection processing which is executed at the CPU 12 when such an instruction is given.

As shown in FIG. 10, when a test print instruction is received while the printer 50 is in the waiting state, control passes from step 200 to step 202, and the state of an image inspection feasibility flag is determined.

If the image inspection feasibility flag is set to OFF, it is determined that image inspection is not possible, control passes to step 204, and a signal indicating that testing is not possible is outputted. For example, such a signal may be notified via the user interface, or to an external section through the interface circuit 18. The signal may be notified to a PC which gave the test print instruction and which is connected to the laser printer 50 through a cable or network, and may be notified through a network to a printer maintenance operator via a remote maintenance system or the like.

If the image inspection feasibility flag is set to ON, control passes to step 206, and print processing is carried out on the basis of image data for an all-white page. This solid-white image data may be stored at the hard disk 16, or may be generated within the system at the time of print processing.

Thereafter, image inspection processing is carried out on print processing results of this all-white page. Specifically, in step 208, the CPU 12 waits for a signal from the IOT controller 20 that print processing has completed. In a next step 210, a predetermined duration after this signal has been received, a photographing instruction is transmitted to the CCD camera 22. The CCD camera 22 photographs the print-processed paper on the paper discharge tray 54 in accordance with this instruction. That is, the CCD camera 22 photographs a state directly after the all-white page has been discharged. The image data photographed by the CCD camera 22 is converted to digital signals at the interface circuit 24 which interfaces with the CCD camera, and is stored at the RAM 14.

Next, image processing is applied to this captured image data stored in the RAM 14 in order to extract the paper region. That is, light/dark correction (shading processing) is applied in step 212, optical distortion correction is applied in step 214, and shape correction from a trapezoid shape to a rectangular shape is applied in step 216. Then, in step 218, the paper region is determined and only the determined paper region is cropped. The result of cropping is stored in the RAM 14.

If there are no image defects in this cropping result, that is, in the cropped image data of the paper region, then the whole of the paper region will be completely white. Accordingly, in a next step 220, the data is binarized according to an appropriate density threshold value and compared with the original image data of the solid white page. Thus, image defects such as black spots, black lines and the like can be detected.

Here, an example of a case in which a solid white page is print-processed and image defects such as black spots, black lines and the like are detected has been explained. However, a solid black page may be print-processed and image defects such as white spots, white lines and the like detected. Also, a solid white page and a solid black page may be printed successively and image defects thereof detected.

Furthermore, rather than a solid white or solid black page, for example, a gray page of a predetermined density may be print-processed and processed in the same way as described above. Image defects such as black spots and black lines and image defects such as white spots and white lines can be simultaneously detected by detection of densities higher or lower than a predetermined density range. To summarize, threshold values which corresponds to the test image data (original image data) of solid white, solid black, a gray page or the like may be found in advance, and such threshold values may be compared with the photographic image data that has been cropped to the paper region.

In a next step 222, results of detection are transmitted. For example, if image defects have been detected, a warning may be displayed at a user interface (not illustrated) which is a display panel or the like provided at the laser printer 50, or a warning may be sent through the interface circuit 18 to an external section and, for example, displayed at a PC connected to the laser printer 50 through a cable or network, from which the test print instruction was given, and/or notified through a network to a printer maintenance operator, via a remote maintenance system or the like,.

In the present embodiments, the CCD camera 22 is disposed upward of the paper discharge portion 53 of the laser printer 50, and the whole of the upper surface of the paper discharge tray 54 is photographed by the CCD camera 22. Thus, inspection of outputted images is carried out by acquiring captured image data which includes the paper 52 discharged onto the paper discharge tray 54. Therefore, the output image can be inspected completely automatically, without requiring a work operation by an operator to set the outputted image in a scanner for reading, as in the prior art. Moreover, image characteristics of the captured image data and the original image data are matched so as to be substantially the same by the image processing. As a result, by taking differences between the two sets of image data, and comparing the captured image data with threshold values corresponding to values of the original image data or the like, image defects can be detected by simple processing.

Moreover, the paper discharge tray 54 is photographed by the CCD camera 22 in the state in which the paper 52 of a first print-processed page according to a print job, which is received directly after a state in which the paper 52 is not present on the paper discharge tray 54, has been discharged, and inspection of the outputted image is carried out using this captured image data. Therefore, there is no need, as in the prior art, to be concerned with displacement of a discharge position. Further, because the color of the paper discharge tray 54 is set to be different from the color of the paper 52, the paper region can be specified easily from the captured image data from the CCD camera 22.

In the processing examples 1 to 4 described above, cases in which the image abnormalities that are detected are partial image defects such as spots, lines and the like have been explained. However, the present invention is not limited to this, and overall image abnormalities may be detected. For example, a specific density pattern may be prepared for application as the original image data, and densities inspected at locations corresponding to the applied specific density pattern. Hence, it can be determined whether or not appropriate image output has been obtained.

In the above descriptions, cases in which image processing, such as the image processing which carries out various corrections on the captured image data, the resolution conversion processing on the original image data and the like, are carried out at the CPU 12 by software processing has been explained. However, the present invention is not limited to this. If a dedicated image-processing circuit is utilized, the image processing may be performed more quickly by this hardware, and it is possible to perform parallel processing with print processing at the CPU 12 and image processing for image inspection at the image-processing circuit (that is, not virtual parallel processing as implemented by time-divided processing). Thus, a processing time can be made short. In particular, this can be applied to a process which carries out continuous image inspection, as described in processing example 3, even in a high-speed output printer.

Figure 11:
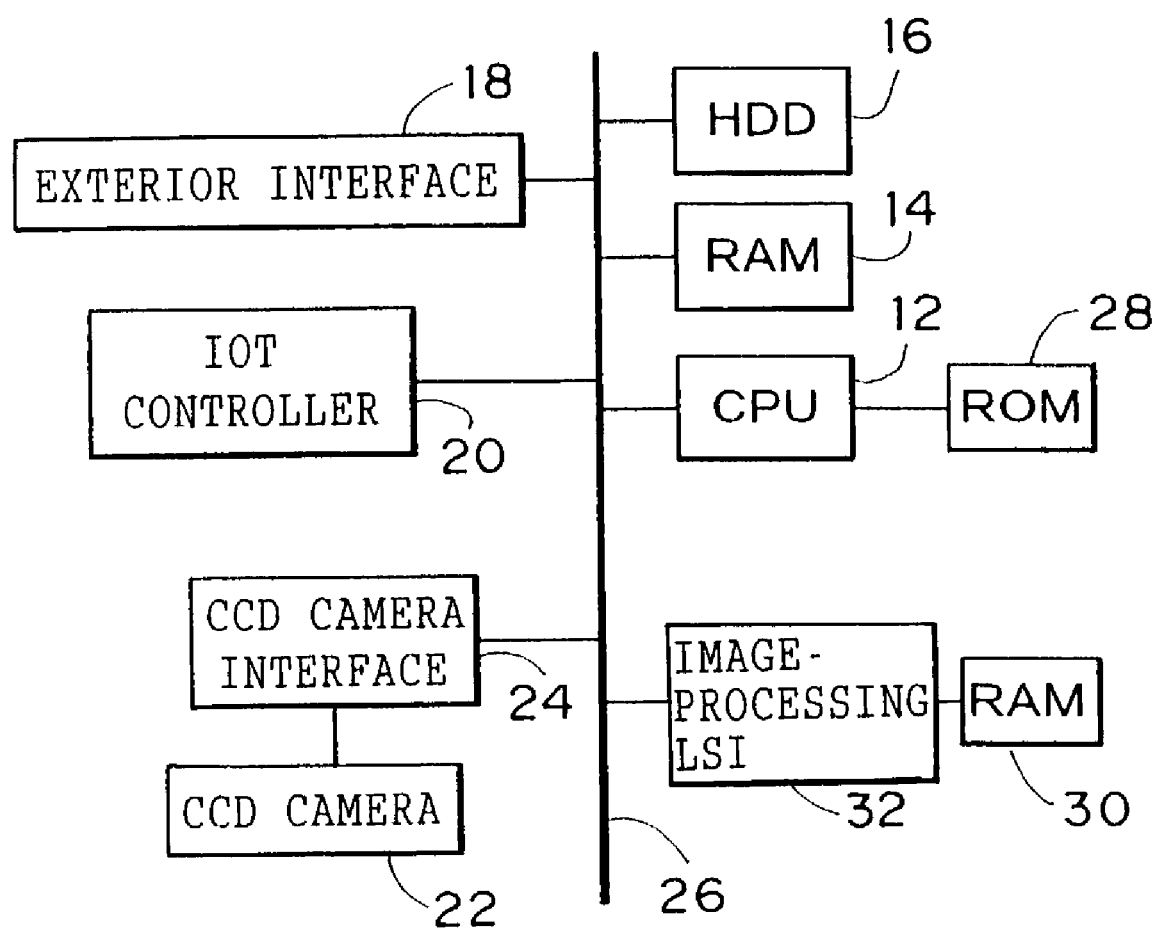
FIG. 11 is a block diagram showing structure of a print processing system relating to another embodiment of the present invention.

As shown in FIG. 11, this can be realized by, for example, connecting an image-processing LSI 32, to which a work RAM 30 is connected, to the data bus 26 in the system shown in FIG. 1. The work RAM 30 may be built into the image-processing LSI 32. In such a case, the CPU 12 corresponds to the controlling section and the image-processing LSI 32 corresponds to the image-processing section and a detecting section.

As shown in the above descriptions, the present invention can be effective to automate and simplify inspection of output images.

What is claimed is:

1. An image inspection device comprising:
   an image capturing section that captures an image recording medium on an output tray and acquires captured image data of the image recording medium, an image being recorded on the image recording medium based on image data, the image recording medium being outputted to the output tray;
   an image-processing section that applies image processing to at least one of the image data and the captured image data for comparing each other; and
   a detecting section that detects a difference between the image data and the captured image data.

2. The image inspection device of claim 1, further comprising:
   a determining section that determines, when the image is recorded in a waiting state, whether the image recording medium is present or absent on the output tray, and wherein the image capturing section captures the image recording medium when the image recording medium is outputted for the first time after the determining section determines that the image recording medium is absent from the output tray.

3. The image inspection device of claim 2, wherein the determining section determines whether the image recording medium is present or absent from the output tray based on the captured image data which is acquired by the image capturing section capturing at a time when the image is recorded in the waiting state.

4. The image inspection device of claim 1, wherein the image-processing section applies to the captured image data: optical distortion correction processing which compensates for optical distortion at the image capturing section; shape correction processing which compensates for geometrical distortion; and specification processing which specifies a region of the image recording medium, and
   the image-processing section applies to the image data: resolution conversion processing which converts a resolution of the image data in accordance with a resolution of the captured image data; and blurring processing which reduces sharpness of the image data in accordance with the captured image data.

5. The image inspection device of claim 4, wherein, in a case in which a plurality of image recording mediums on each of which an image is recorded are outputted based on output instructions,
   the captured image data is acquired by capturing a first image recording medium when the first image recording medium is outputted, a specification position, which specifies the region of the first image recording medium, is obtained by the specification processing being applied to the captured image data, and the image-processing section applies the specification processing to captured image data of the image recording mediums that are outputted subsequent to output of the first image recording medium on the basis of the specification position.

6. The image inspection device of claim 4, wherein the image-processing section applies the image processing to the image data subject to rasterizating.

7. The image inspection device of claim 1, wherein the image-processing section applies to the captured image data: optical distortion correction processing which compensates for optical distortion at the image capturing section; and specification processing which specifies a region of the image recording medium, and the image-processing section applies to the image data: resolution conversion processing which converts a resolution of the image data in accordance with a resolution of the captured image data; shape correction processing which applies geometrical distortion to the image data in accordance with the captured image data; and blurring processing which reduces sharpness of the image data in accordance with the captured image data.

8. The image inspection device of claim 1, wherein the image data is a predetermined test image data, the image-processing section applies to the captured image data: optical distortion correction processing which compensates for optical distortion at the image capturing section; shape correction processing which compensates for geometrical distortion; and specification processing which specifies a region of the image recording medium, and the detecting section compares the captured image data that is image-processed by the image-processing section with a threshold value specified in advance in accordance with the test image data.

9. The image inspection device of claim 1, wherein the image-processing section sets resolutions, sharpnesses and configurations of images based on the image data and the captured image data to be substantially the same as one another.

10. The image inspection device according to claim 1, wherein the image-processing section applies image processing to at least one of the image data and the captured image data for setting image characteristics of the image data and the captured image data to be substantially the same as one another.

11. The image inspection device according to claim 10, wherein the characteristics has at least one resolution, shape, and brightness.

12. The image inspection device according to claim 1, wherein the difference detected by the detecting section is an abnormality of the image recorded on the image recording medium.

13. The image inspection device according to claim 1, wherein the image capturing section captures an output tray in a state in which the image recording medium is not present on the output tray and stores captured output tray data in a memory.

14. The image inspection device according to claim 1, wherein the image capturing section is disposed at a position that enables the image capturing section to capture the whole of an upper surface of the output tray.

15. An image output apparatus comprising:

an image recording unit that records an image on an image recording medium based on image data and outputs the image recording medium to an output tray;

an image inspection device comprising:

an image capturing section that captures an output image, the output image having a region of the image recording medium and/or a region of the output tray, the region of the image recording medium in the output image being different from the region of the output tray in the output image;

a controlling section that controls the image capturing section to acquire captured image data from the output image, the captured image data including data of the region of the image recording medium;

an image-processing section that applies image processing to at least one of the image data and the captured image data for comparing each other; and a detecting section that detects a difference between the image data and the captured image data.

* * * * *